(12) United States Patent
Wada

(10) Patent No.: US 8,559,683 B2
(45) Date of Patent: Oct. 15, 2013

(54) ELECTRONIC APPARATUS AND SCENE-TYPE DISPLAY METHOD

(75) Inventor: Kouetsu Wada, Nishitama-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 109 days.

(21) Appl. No.: 13/343,653

(22) Filed: Jan. 4, 2012

(65) Prior Publication Data

US 2012/0106923 A1    May 3, 2012

Related U.S. Application Data

(63) Continuation of application No. 12/233,438, filed on Sep. 18, 2008, now abandoned.

(30) Foreign Application Priority Data

Sep. 28, 2007    (JP) ................. 2007-256238

(51) Int. Cl.
*G06K 9/00*    (2006.01)
*H04N 9/80*    (2006.01)

(52) U.S. Cl.
USPC ........... 382/118; 348/564; 386/241; 715/838; 725/10; 725/40

(58) Field of Classification Search
USPC ........... 382/118; 348/564; 386/241; 715/838; 725/10, 40
See application file for complete search history.

(56) References Cited

U.S. PATENT DOCUMENTS

| | | | |
|---|---|---|---|
| 7,757,172 B2 | 7/2010 | Yokoi | |
| 7,970,257 B2 | 6/2011 | Momosaki | |
| 7,986,819 B2 | 7/2011 | Momosaki | |
| 2002/0073417 A1 | 6/2002 | Kondo et al. | |
| 2004/0218896 A1 | 11/2004 | Abe et al. | |
| 2007/0274596 A1 | 11/2007 | Murata et al. | |
| 2008/0144890 A1 | 6/2008 | Ogawa | |
| 2009/0089822 A1 | 4/2009 | Wada | |

FOREIGN PATENT DOCUMENTS

| | | |
|---|---|---|
| JP | 11317058 | 11/1999 |
| JP | 2001-203973 | 7/2001 |
| JP | 2003-223176 | 8/2003 |
| JP | 2003-339010 | 11/2003 |
| JP | 2005-317165 | 11/2005 |
| JP | 2006-54622 | 2/2006 |
| JP | 2007-49332 | 2/2007 |
| JP | 2007-241496 | 9/2007 |
| JP | 2007-280325 | 10/2007 |

OTHER PUBLICATIONS

Japanese Patent Application No. 2007-256238, First Office Action, mailed Apr. 17, 2012, (with English Translation).
Japanese Patent Application No. 2007256238, Notice of Reasons for Rejection, mailed Aug. 30, 2011, (with English Translation).
U.S. Appl. No. 12/233,438, Notice of Allowance, mailed Oct. 4, 2011.

*Primary Examiner* — Minh-Loan T Tran
(74) *Attorney, Agent, or Firm* — Blakely, Sokoloff, Taylor & Zafman LLP

(57) ABSTRACT

According to one embodiment, an electronic apparatus includes a storage device configure to store cheer level information which indicate a time change of a cheer level included in video content data and applause level information which indicate a time change of applause level included in the video content data, and video content information displaying module configure to display two types of graphs of a cheer graph showing a time change of the cheer level in accordance with the cheer level information and an applause graph showing a time change of the applause level in accordance with the applause level information in a volume level indication area in a two-dimensional display area.

14 Claims, 14 Drawing Sheets

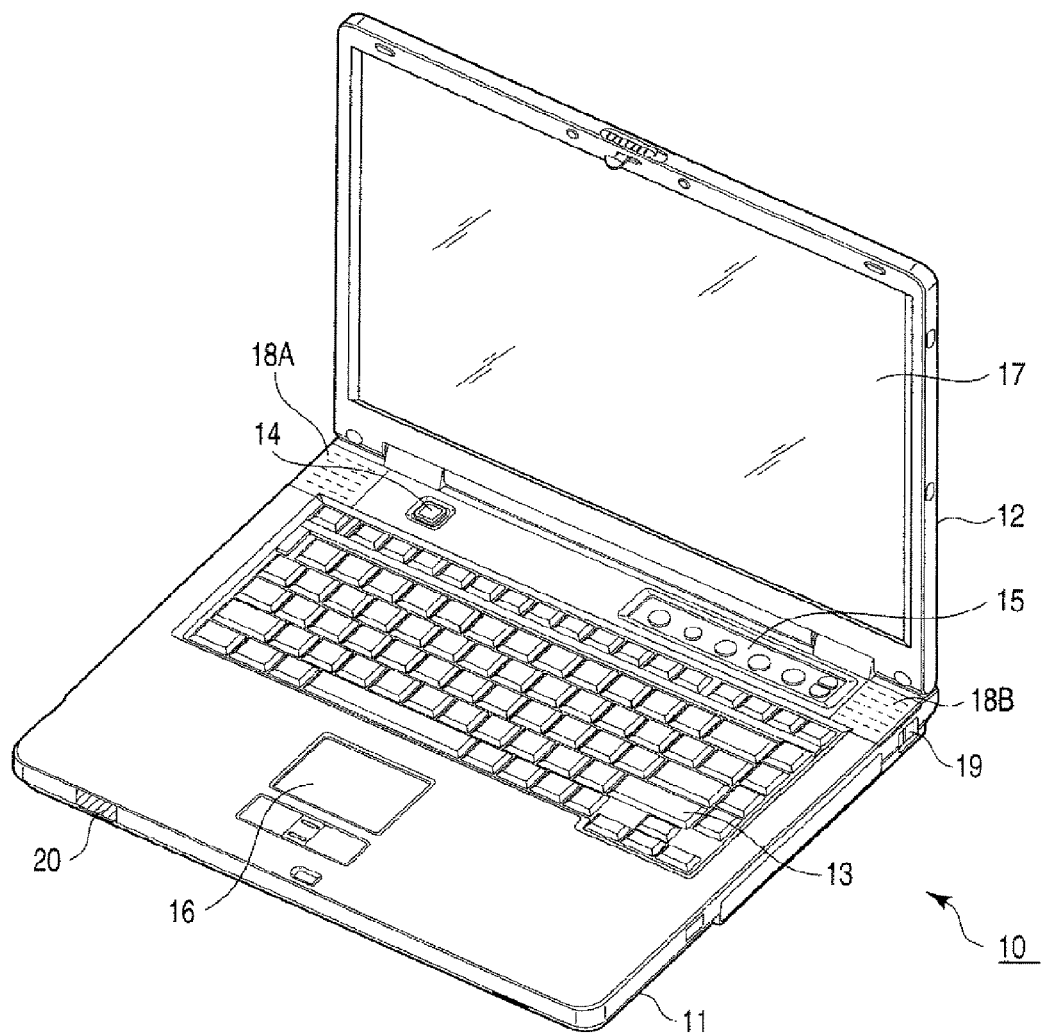
F I G. 1

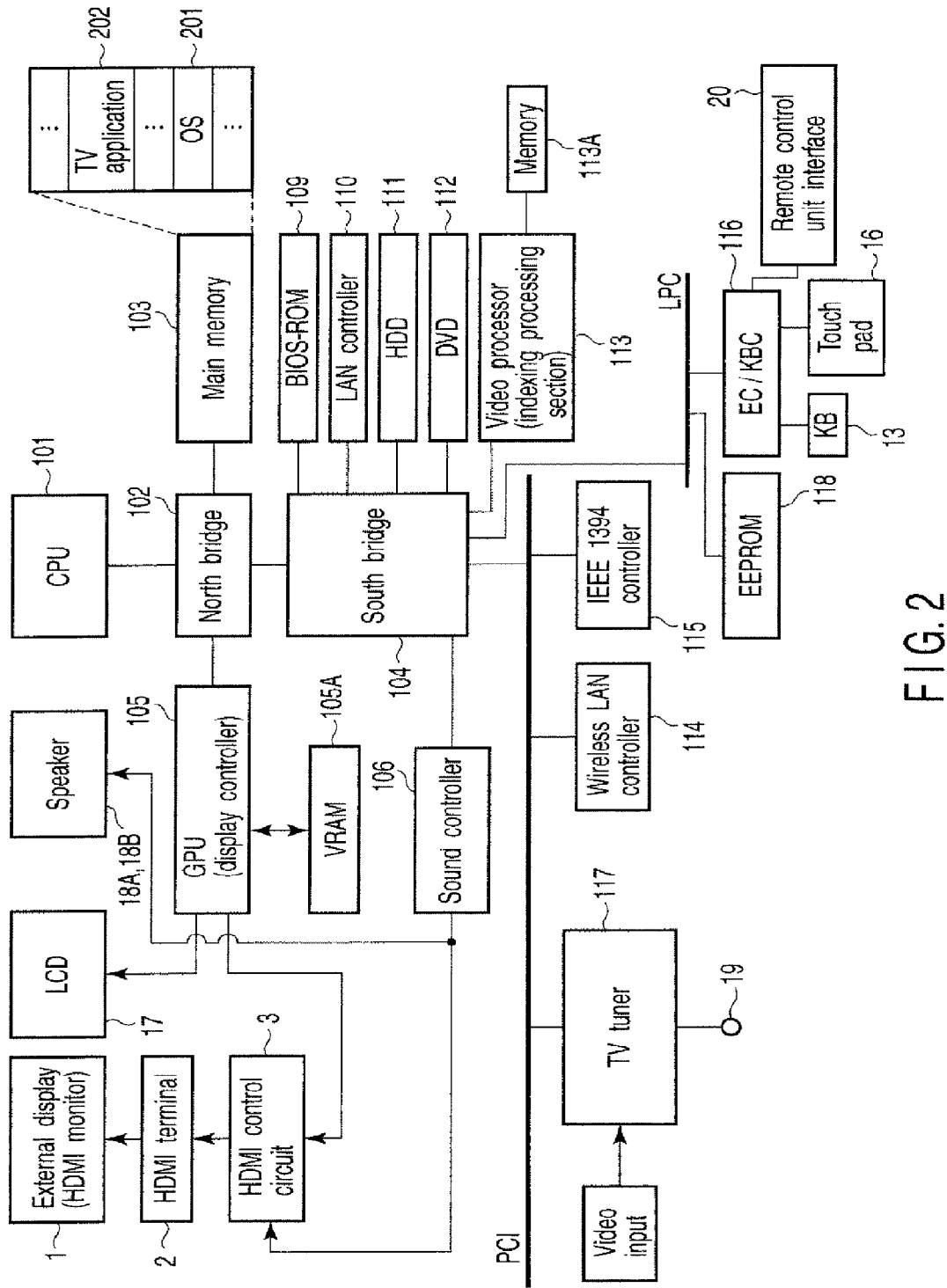
F I G. 2

Attribute detection result information

Commercial section table

| Commercial section 1 | Start time, end time |
|---|---|
| Commercial section 2 | Start time, end time |
| ⋮ | ⋮ |

Music section table

| Music section 1 | Start time, end time |
|---|---|
| Music section 2 | Start time, end time |
| ⋮ | ⋮ |

Talk section table

| Talk section 1 | Start time, end time |
|---|---|
| Talk section 2 | Start time, end time |
| ⋮ | ⋮ |

Cheer / highlight level table

| Time | Cheer volume level | Applause volume level |
|---|---|---|
| T1 | 10 | 5 |
| T2 | 20 | 5 |
| T3 | 10 | 6 |
| ⋮ | ⋮ | ⋮ |

FIG. 4

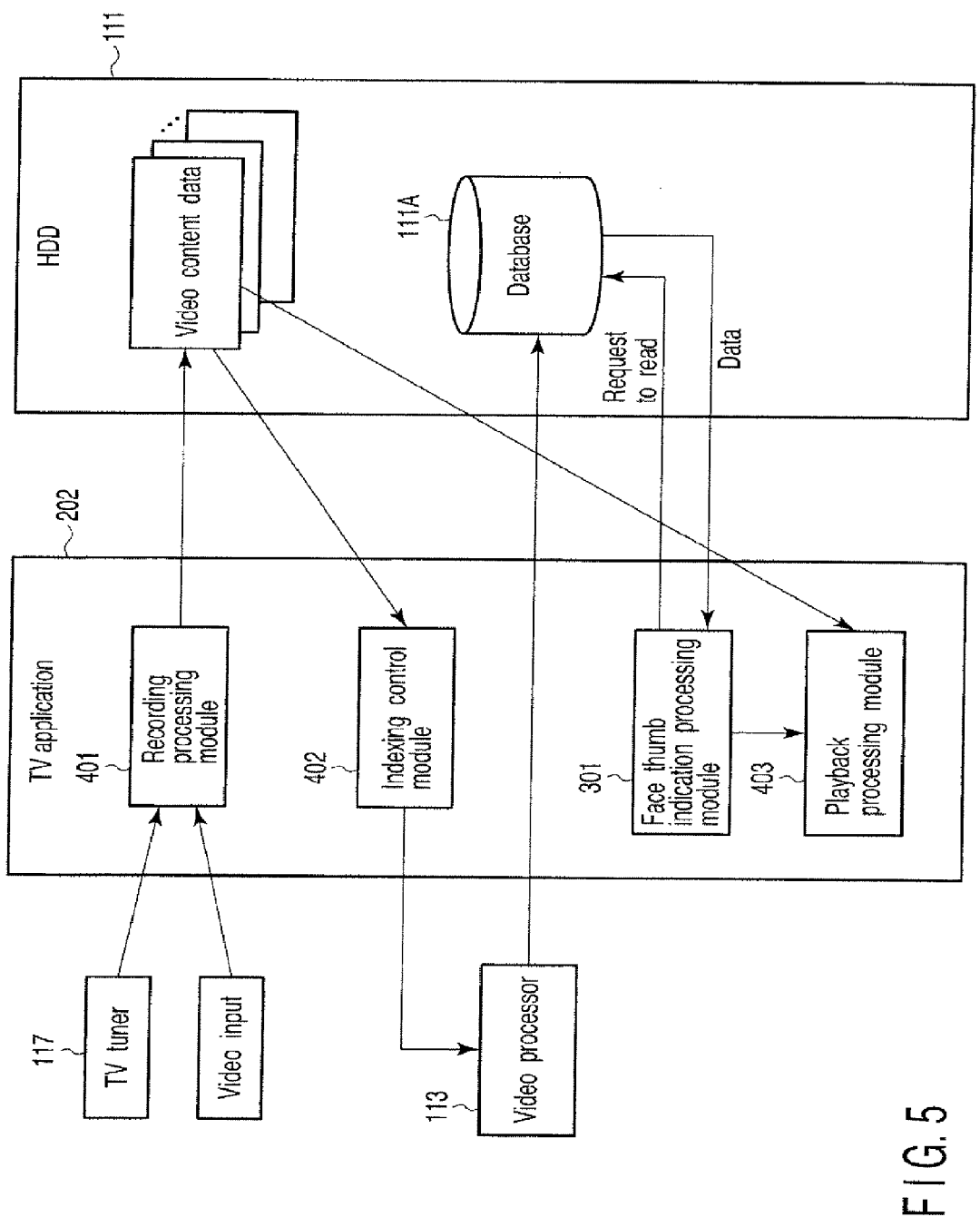
F I G. 5

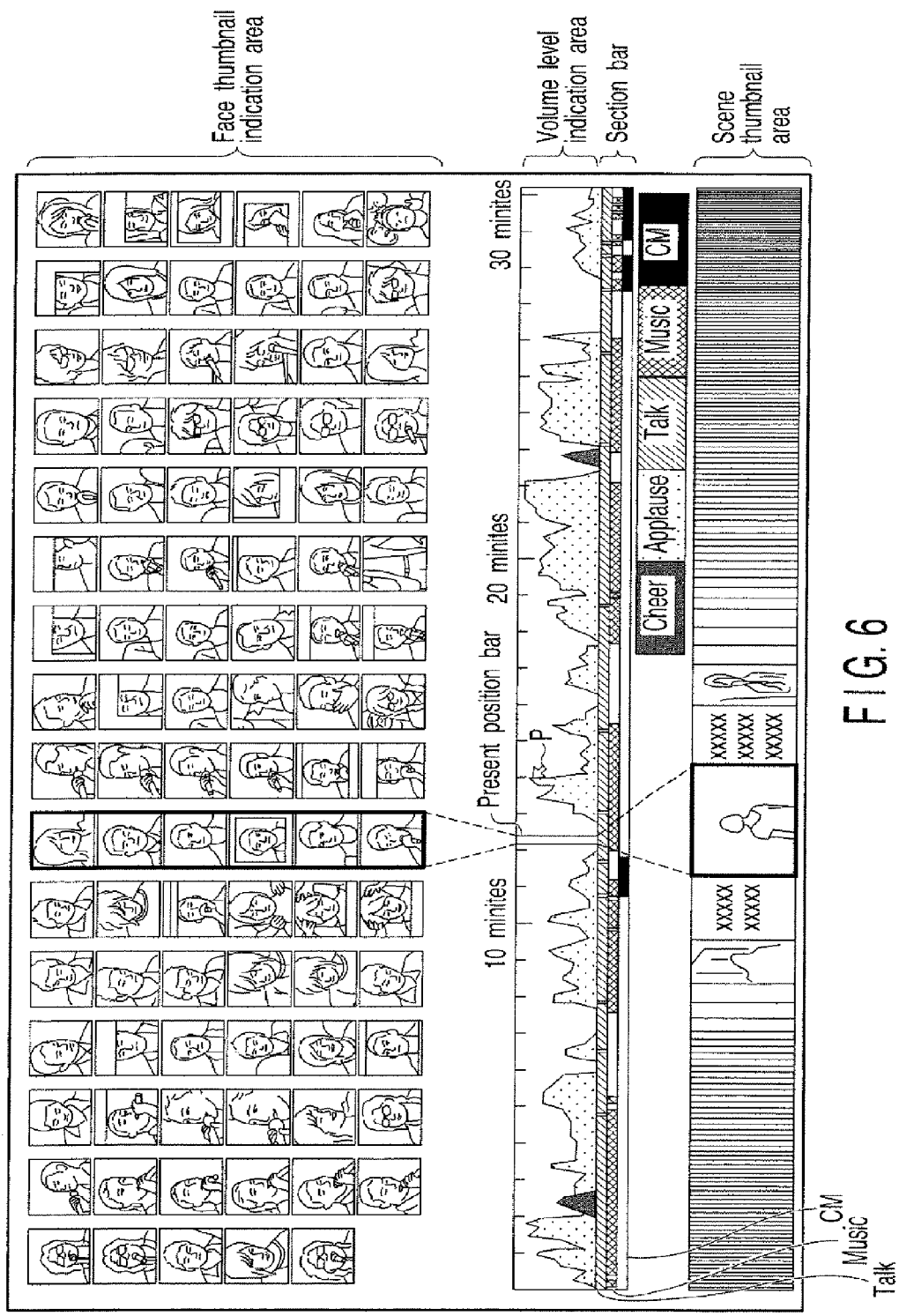
F I G. 6

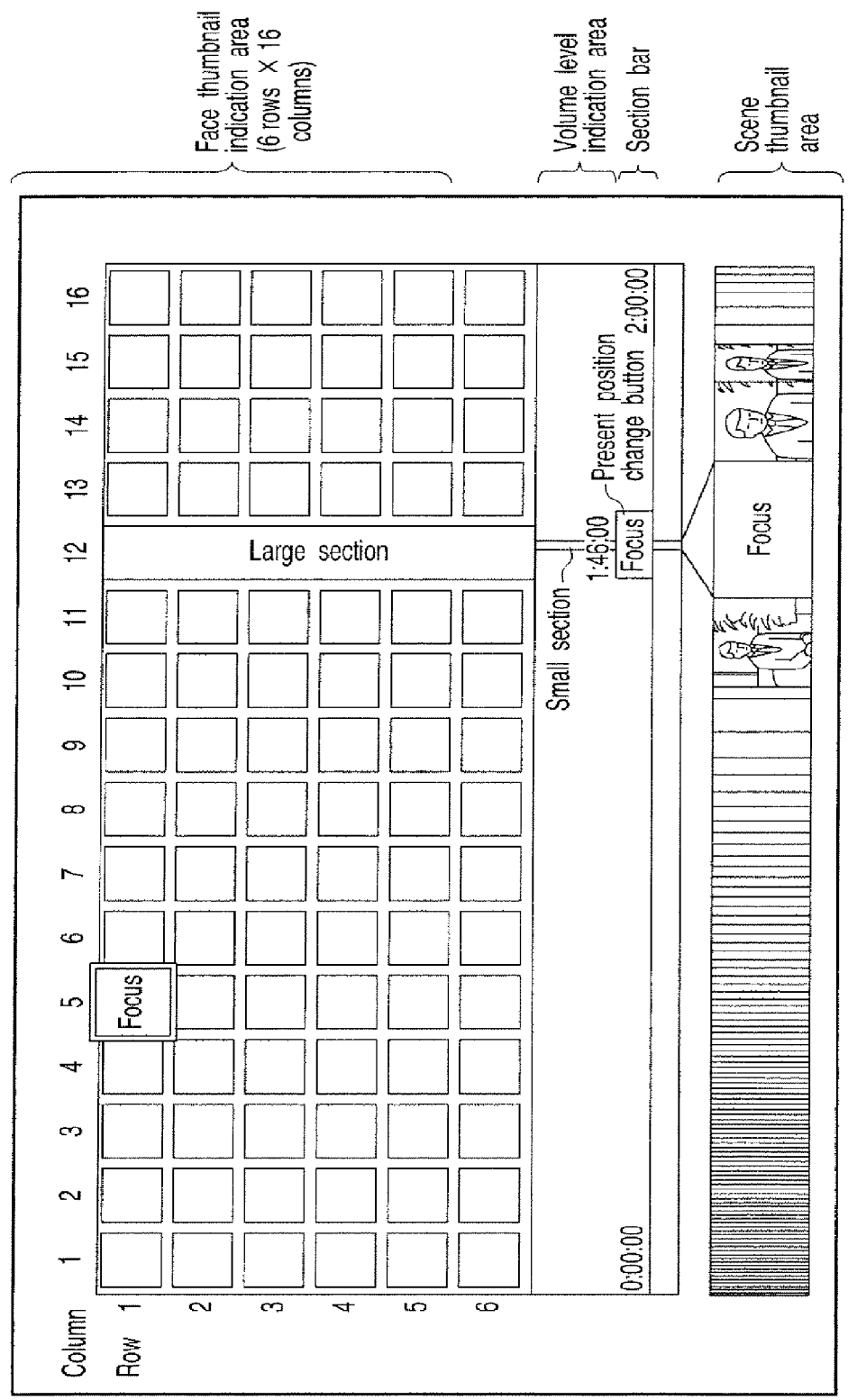
F I G. 9

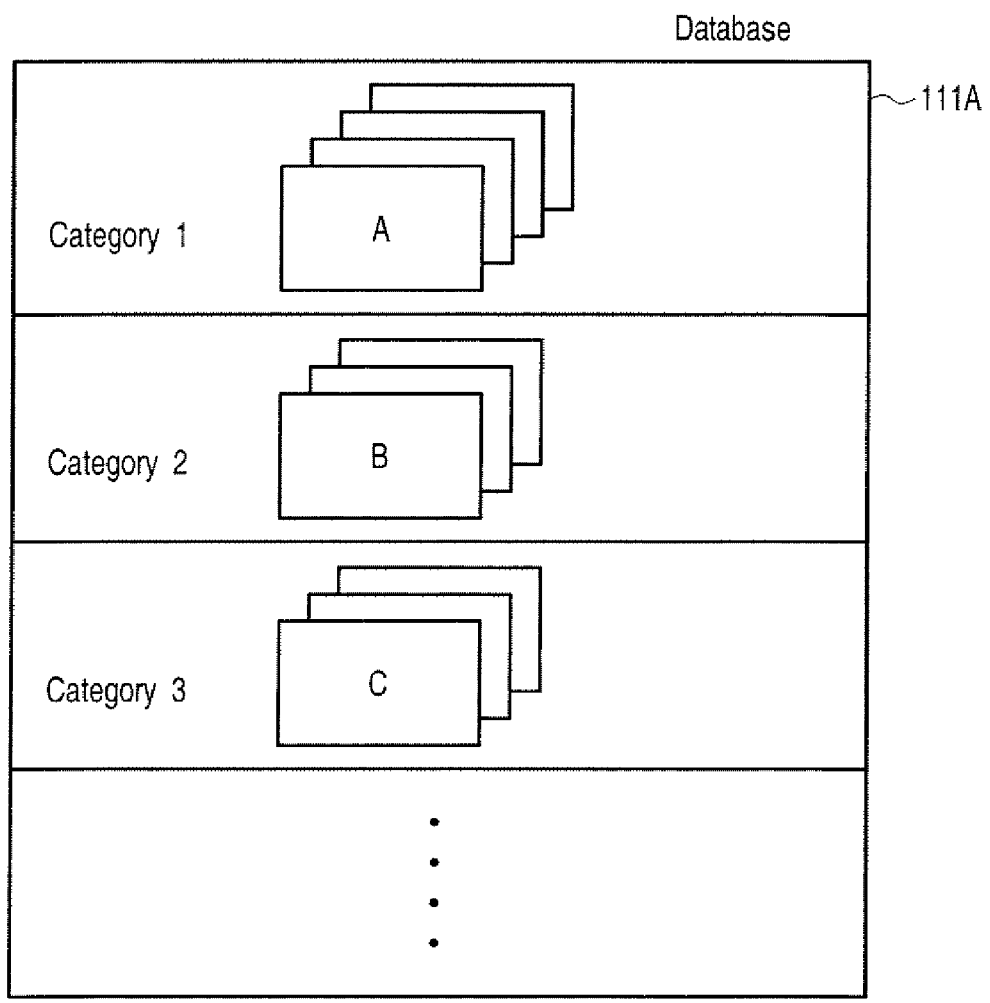
F I G. 11

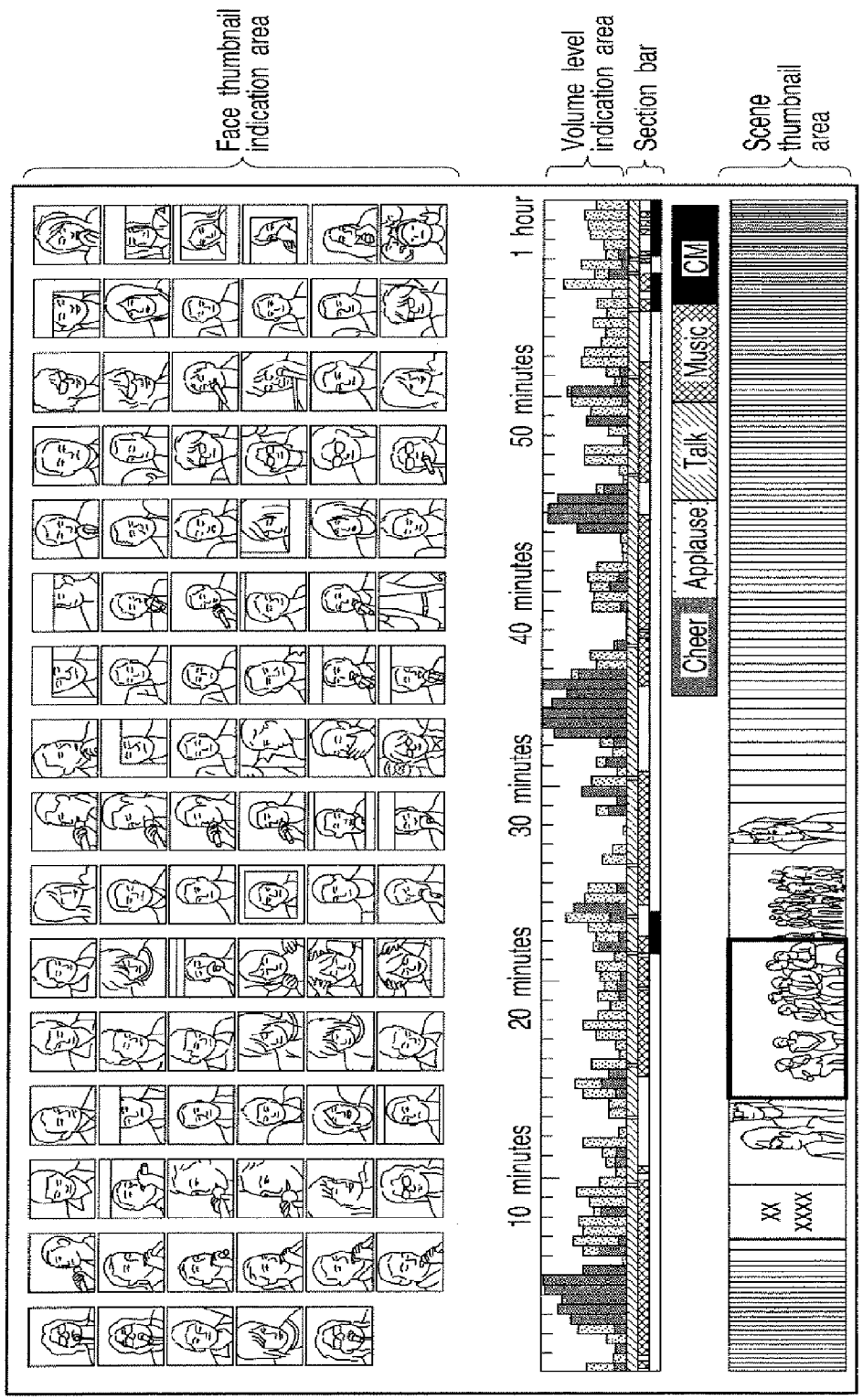
F I G. 13

ELECTRONIC APPARATUS AND SCENE-TYPE DISPLAY METHOD

CROSS-REFERENCE TO RELATED APPLICATIONS

This application is based upon and claims the benefit of priority from U.S. patent application Ser. No. 12/233,438, filed Sep. 18, 2008 and is based upon and claims the benefit of priority from Japanese Patent Application No. 2007-256238, filed Sep. 28, 2007, the entire contents of which are incorporated herein by reference.

BACKGROUND

1. Field

One embodiment of the present invention relates to an electronic device and a scene-type display method which displays a facial image showing information that identifies a scene included in image content data.

2. Description of the Related Art

In general, an electronic apparatus such as a video recorder or a personal computer can record and playback various kinds of video content data such as television broadcast program data.

For example, when recorded video content data is a soccer game, there may be a demand to watch, e.g., a goal scene alone to reduce viewing time. Cheers occur in a goal scene. Therefore, it can be presumed that a point where cheers occur is the goal scene.

Jpn. Pat. Appln. KOKAI Publication No. 2006-54622 discloses an information signal processing method of performing various kinds of characteristic extraction processing for predetermined ticker characteristic data, person characteristic data, other image characteristic data, a speaker voice characteristic data, "applause and cheer characteristic data", and other sound characteristic data in characteristic extraction processing for image and sound data. Further, it also discloses that, when a user sets a display symbol of each characteristic and each display symbol is displayed on a time axis, each section can be identified and displayed.

However, when applause and cheer characteristics including both applause and cheers are extracted as in Jpn. Pat. Appln. KOKAI Publication No. 2006-54622, there may be an inconvenience. For example, in case of a variety program, it can be considered that both a scene with a cheer and a scene with applause are highlight scenes. However, the two scenes have different types of highlights. For example, the scene with a cheer may be a scene where a performer appears. Furthermore, the scene with applause may be a scene where a performer's talk is interesting and gathers stream.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is a perspective view showing an example of an appearance of an electronic apparatus according to an embodiment of the present invention;

FIG. 2 is a block diagram showing an example of a system configuration of the electronic apparatus according to the embodiment;

FIG. 4 is a view showing an example of section attribute information (attribute detection result information) used in the electronic apparatus according to the embodiment;

FIG. 5 is an exemplary block diagram showing a functional structure of a program used in the electronic apparatus according to the embodiment;

FIG. 6 is a view showing an example of an indexing view screen displayed in a display apparatus by the electronic apparatus according to the embodiment;

FIG. 9 is a view for explaining a relationship between the face thumbnail indication area and a scene thumbnail indication area included in the indexing view screen depicted in FIG. 6;

FIG. 11 is a view showing a state where face thumbnail snapshots are classified into respective categories by the electronic apparatus according to the embodiment;

FIG. 13 is an exemplary view showing a modification of the indexing view screen displayed in the display apparatus by the electronic apparatus according to the embodiment.

DETAILED DESCRIPTION

Figure 3:
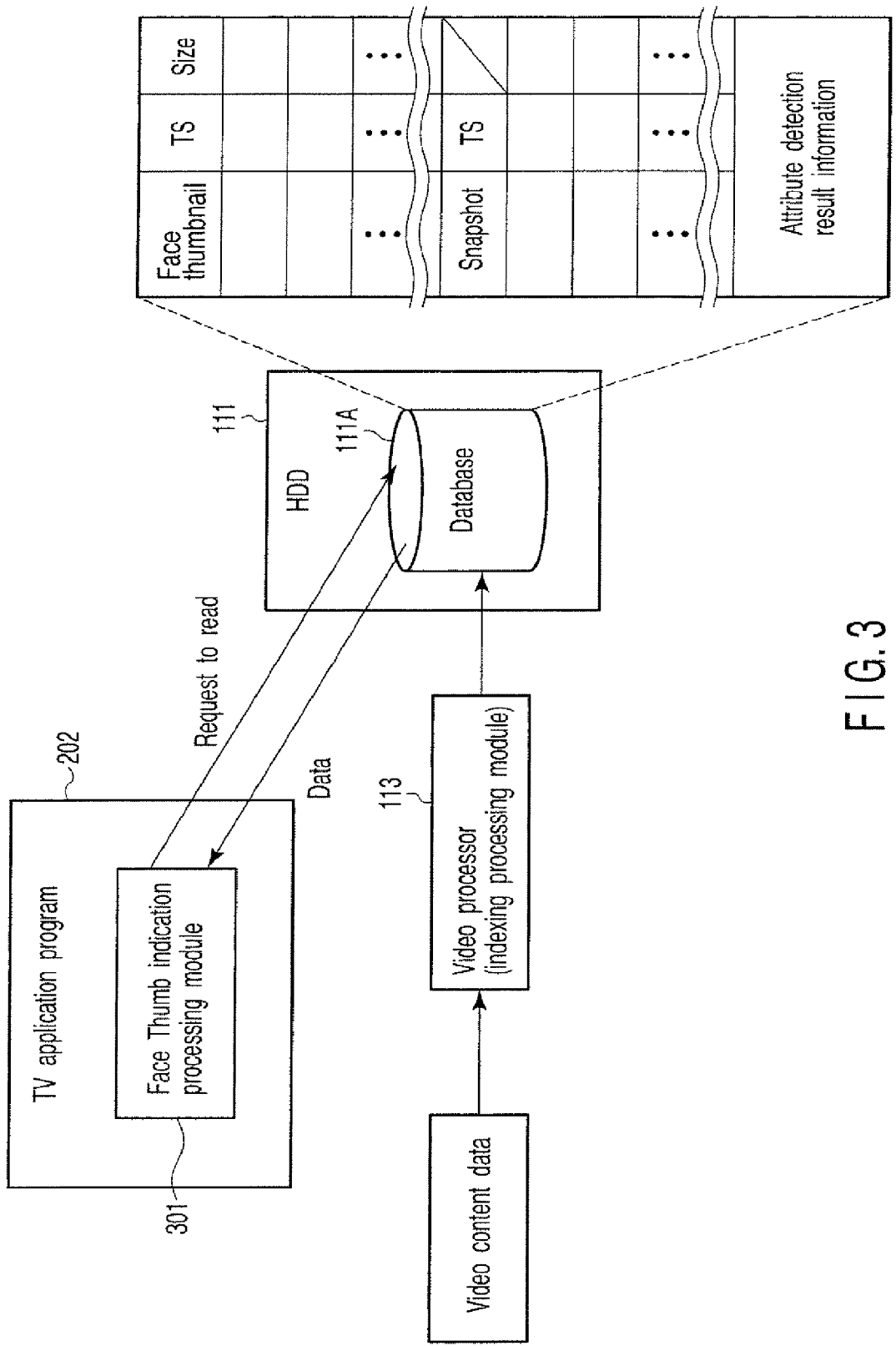
FIG. 3 is an exemplary block diagram for explaining a face thumbnail snapshot indication function of the electronic apparatus according to the embodiment.

Various embodiments according to the invention will be described hereinafter with reference to the accompanying drawings. In general, according to one embodiment of the invention, an electronic apparatus comprises a storage device configure to store cheer level information which indicate a time change of a cheer level included in video content data and applause level information which indicate a time change of applause level included in the video content data, and video content information displaying module configure to display two types of graphs of a cheer graph showing a time change of the cheer level in accordance with the cheer level information and an applause graph showing a time change of the applause level in accordance with the applause level information in a volume level indication area in a two-dimensional display area, an abscissa of the cheer graph and the applause graph indicating a time axis, an ordinate of the cheer graph and the applause graph indicates the cheer level or the applause level, the time axis of the two types of graphs indicating a start position to an end position of the video content data.

First, a configuration of an electronic apparatus according to one embodiment of the present invention will be explained with reference to FIGS. 1 and 2. The electronic apparatus according to this embodiment is realized as, e.g., a notebook type portable personal computer 10 that functions as an information processing apparatus.

This personal computer 10 can record and play back video content data (audio visual content data) such as broadcast program data or video data input from an external device. That is, the personal computer 10 has a television (TV) function of executing viewing and recording of broadcast program data broadcast by using a television broadcast signal. This TV function is realized by, e.g., a TV application program previously installed in the personal computer 10. Further, the TV function also has a function of recording video data input from an external AV device and a function of playing back recorded video data and recorded broadcast program data.

Furthermore, the personal computer 10 has a face thumbnail snapshot indication function (face navigation function) of displaying, e.g., a list of face thumbnail snapshots of persons who appear in video content data such as video data or broadcast program data stored in the personal computer 10. This face navigation function is implemented as, e.g., one function in the TV function. The face navigation function is one of snapshot indexing functions that present a user, e.g., an outline of video content data. This face navigation function can present a user which person appears in which time zone in entire video content data. Furthermore, this face navigation function can pay attention to a predetermined attribute section included in video content data to display a list of persons.

FIG. 1 is a perspective view showing a state where a display unit of the computer 10 is opened. This computer 10 is formed of a computer main body 11 and a display unit 12. A display apparatus formed of a thin-film-transistor liquid crystal display (TFT-LCD) 17 is incorporated in the display unit 12.

The display unit 12 is disposed to the computer main body 11 in such a manner that the display unit 12 can swivel without restraint between an opened position where an upper surface of the computer main body 11 is exposed and a closed position where the upper surface of the computer main body 11 is covered. The computer main body 11 has a thin box-like case, and a keyboard 13, a power button 14 that turns on/off the computer 10, an input operation panel 15, a touch pad 16, speakers 18A and 18B, and others are arranged on an upper surface of this case.

The input operation panel 15 is an input apparatus that inputs an event corresponding to a pressed button, and includes a plurality of buttons that activate a plurality of functions, respectively. This button group also includes an operation button group that is used to control the TV function (viewing, recording, and playback of broadcast program data/video data). Moreover, a remote control unit interface module 20 that executes communication with a remote control unit that remotely controls the TV function of the computer 10 is provided on a front surface of the computer main body 11. The remote control unit interface module 20 is formed of, e.g., an infrared signal receiving module.

A TV broadcast antenna terminal 19 is provided on, e.g., a right side surface of the computer main body 11. Additionally, an external display connection terminal conforming to, e.g., the High-Definition Multimedia Interface (HDMI) standard is provided on, e.g., a rear surface of the computer main body 11. This external display connection terminal is used to output image data (moving image data) included in video content data such as broadcast program data to an external display.

A system configuration of the computer 10 will now be explained with reference to FIG. 2.

As shown in FIG. 2, the computer 10 includes a CPU 101, a north bridge 102, a main memory 103, a south bridge 104, a graphics processing unit (GPU) 105, a video memory (VRAM) 105A, a sound controller 106, a BIOS-ROM 109, an LAN controller 110, a hard disk drive (HDD) 111, a DVD drive 112, a video processor 113, a memory 113A, a wireless LAN controller 114, an IEEE 1394 controller 115, an embedded controller/keyboard controller IC (EC/KBC) 116, a TV tuner 117, an EEPROM 118, and others.

The CPU 101 is a processor that controls operations of the computer 10, and executes various kinds of application programs such as an operating system (OS) 201 or a TV application program 202 which is loaded from the hard disk drive (HDD) 111 to the main memory 103. The TV application program 202 is software that executes the TV function. This TV application program 202 executes live playback processing to view broadcast program data received by the TV tuner 117, recording processing to record the received broadcast program data in the HDD 111, playback processing to play back the broadcast program data/video data recorded in the HDD 111, and others. Further, the CPU 101 also executes a basic input-output system (BIOS) stored in the BIOS-ROM 109. The BIOS is a program for hardware control.

The north bridge 102 is a bridge device that connects a local bus of the CPU 101 with the south bridge 104. The north bridge 102 also has a built-in memory controller that performs access control over the main memory 103. Furthermore, the north bridge 102 also has a function of executing communication with the GPU 105 through, e.g., a serial bus based on the PCI EXPRESS standard.

The GPU 105 is a display controller that controls the LCD 17 which is used as a display monitor of the computer 10. A display signal generated by this GPU 105 is supplied to the LCD 17. Moreover, the GPU 105 can also transmit a digital video signal to an external display apparatus 1 through an HDMI control circuit 3 and an HDMI terminal 2.

The HDMI terminal 2 is the above-explained external display connection terminal. The HDMI terminal 2 can transmit a non-compressed digital video signal and a digital audio signal to the external display apparatus 1 such as a television set through one cable. The HDMI control circuit 3 is an interface that transmits the digital video signal to the external display apparatus 1 called an HDMI monitor through the HDMI terminal 2.

The south bridge 104 controls each device on a low pin count (LPC) bus and each device on a Peripheral Component Interconnect (PCI) bus. Additionally, the south bridge 104 has a built-in Integrated Drive Electronics (IDE) controller that controls the hard disk drive (HDD) 111 and the DVD drive 112. Further, the south bridge 104 also has a function of executing communication with the sound controller 106.

Furthermore, the video processor 113 is connected with the south bridge 104 through, e.g., a serial bus based on the PCI EXPRESS standard.

The video processor 113 is a processor that executes various kinds of processing concerning the above-explained screen image indexing. This video processor 113 functions as an indexing processing module that executes screen image indexing processing. That is, in the screen image indexing processing, the video processor 113 extracts a plurality of face thumbnail snapshot from screen image included in video content data and outputs, e.g., time stamp information indicative of a time point at which each extracted face thumbnail snapshot appears in the video content data. Extraction of face thumbnail snapshots is executed based on, e.g., face detection processing of detecting a facial region from each frame in screen image data, cutout processing of cutting out a detected face thumbnail snapshot from the frame, and others. Detection of the facial region can be performed by, e.g., analyzing characteristics of a screen image in each frame and searching for a region having characteristics similar to facial image characteristic samples prepared in advance. The facial image characteristic samples are characteristic data obtained by statistically processing respective facial image characteristics of many persons.

Moreover, the video processor 113 also executes, e.g., processing of detecting a commercial section included in video content data and sound indexing processing. A time length of each commercial section is set to one of several preset time lengths. Additionally, a silence period having a fixed time length is present before and after the commercial section. Therefore, in commercial section detection processing, for example, audio data included in video content data is analyzed, and the silence period having a fixed time length is detected. Further, a section which is sandwiched between two detected continuous silence sections and includes partial data having a time length equal to or above a fixed value is detected as the commercial section.

Sound indexing processing is indexing processing of analyzing audio data included in video content data to detect a music section where music is put on and a talk section where a person is having a talk in the video content data. In the sound indexing processing, for example, characteristics of a frequency spectrum of audio data are analyzed, and the music section and the talk section are detected in accordance with the characteristics of the frequency spectrum. Since characteristics of a frequency spectrum associated with the music section are different from characteristics of a frequency spectrum associated with the talk section, analyzing characteristics of each frequency spectrum enables detecting the music section or the talk section.

Talk section detection processing uses, e.g., a speaker segmentation technology or a speaker clustering technology and thereby detect switching of speakers. A period where the same speaker (or the same speaker group) is continuously having a talk is one talk section.

Furthermore, the sound indexing processing executes cheer level detection processing of detecting a cheer level in accordance with each partial data (data having a fixed time length) in the video content data and applause level detection processing of detecting an applause level in accordance with each partial data in the video content data.

The cheer level represents a magnitude of a cheer. The cheer is sound in which voices of many people are mixed. The sound in which voices of many people are mixed has a distribution of a specific frequency spectrum. In the cheer level detection processing, a frequency spectrum of audio data contained in the video content data is analyzed and a cheer level of each partial data is detected in accordance with an analysis result of this frequency spectrum.

The applause level represents a magnitude of relatively vigorous applause. The applause is a sound volume level in a section where a certain sound volume level or above is continuously generated for a fixed time length or more. In the applause level detection processing, a distribution of a sound volume of audio data included in the video content data is analyzed, and an applause level is detected based on a result of this analysis. For example, the applause can be detected based on a magnitude of sound and dispersion in a time direction. Furthermore, an evaluation model may be created from applause or laughing voice in place of a cheer and matching may be performed by using, e.g., a frequency domain to effect detection.

The memory 113A is used as a work memory of the video processor 113. A large amount of calculation is required to execute the indexing processing (the commercial detection processing, the screen image indexing processing, and the sound indexing processing). In this embodiment, the video processor 131 as a dedicated processor different from the CPU 101 is used as a back-end processor, and this video processor 113 executes the indexing processing. Therefore, the indexing processing can be executed without increasing a load of the CPU 101. It is to be noted that the commercial detection processing can be executed by analyzing audio data as explained above, and hence the commercial detection processing can be handled as one type of processing in the sound indexing processing.

The sound controller 106 is a sound source device and outputs audio data as a playback target to the speakers 18A and 18B or the HDMI control circuit 3.

The wireless LAN controller 114 is a wireless communication device that executes wireless communication based on, e.g., an IEEE 802.11 standard. The IEEE 1394 controller 115 executes communication with an external device through a serial bus based on an IEEE 1394 standard.

The embedded controller/keyboard controller IC (EC/KBC) 116 is a one-chip microcomputer in which an embedded controller that manages an electric power and a keyboard controller that controls the keyboard (KB) 13 and the touch pad 16 are integrated. This embedded controller/keyboard controller IC (EC/KBC) 116 has a function of turning on/off a power supply of the computer 10 in accordance with an operation of the power button 14 by a user. Furthermore, the embedded controller/keyboard controller IC (EC/KBC) 116 has a function of executing communication with the remote control unit interface 20.

The TV tuner 117 is a reception apparatus that receives broadcast program data broadcast by using a television (TV) broadcast signal, and connected with the antenna terminal 19. This TV tuner 117 is realized as, e.g., a digital TV tuner that can receive digital broadcast program data such as terrestrial digital TV broadcasting. Moreover, the TV tuner 117 also has a function of capturing video data input from an external device.

A face navigation function executed by the TV application program 202 will now be explained with reference to FIG. 3.

As explained above, the indexing processing (screen image indexing processing and sound indexing processing) with respect to video content data such as broadcast program data is executed by the video processor 113 that functions as the indexing processing module as explained above.

The video processor 113 executes the indexing processing with respect to video content data such as recorded broadcast program data specified by a user under control of the TV application program 202, for example. Additionally, the video processor 113 can also execute the indexing processing with respect to the broadcast program data in parallel with recording processing of storing the broadcast program data received by the TV turner 117 in the HDD 111.

In the screen image indexing processing (which is also referred to as face thumbnail snapshot indexing processing), the video processor 113 analyzes moving image data included in video content data in units of frame. Further, the video processor 113 extracts face thumbnail snapshots of persons from a plurality of frames constituting the moving image data and outputs time stamp information indicative of a time point at which each extracted face thumbnail snapshot appears in the video content data. As the time stamp information corresponding to each face thumbnail snapshot, it is possible to use an elapsed time from start of the video content data to appearance of the face thumbnail snapshot, a frame number from which the face thumbnail snapshot is extracted, and others.

Furthermore, the video processor 113 also outputs the size (resolution) of each extracted face thumbnail snapshot. Face detection result data (face thumbnail snapshot, time stamp information TS, and size) output from the video processor 113 is stored in a database 111A as face thumbnail indexing information. This database 111A is a storage region for indexing data storage prepared in the HDD 111.

Moreover, in the screen image indexing processing, the video processor 113 also executes scene thumbnail snapshot acquisition processing in parallel with processing of extracting face thumbnail snapshots. A scene thumbnail snapshot is an image (reduced image) corresponding to each of the plurality of frames extracted from the video content data at, e.g., equal time intervals. That is, the video processor 113 sequentially extracts the frames from the video content data at, e.g., predetermined equal time intervals irrespective of whether the frames are frames including face thumbnail snapshots, and outputs an image corresponding to each extracted frame (scene thumbnail snapshot) and time stamp information TS indicative of a time point at which this scene thumbnail snapshot appears. Scene thumbnail snapshot acquisition result data (scene thumbnail snapshot, time stamp information TS) output from the video processor 113 is also stored in the database 111A as scene thumbnail indexing information.

Moreover, in the sound indexing processing, the video processor 113 analyzes audio data included in the video content data, detects a plurality of types of attribute sections (commercial section, music section, and talk section) included in the video content data, and outputs section attribute information indicative of a start time point and an end time point of each detected attribute section. This section attribute information is stored in the database 111A as attribute detection result information. Additionally, in the sound indexing processing, the video processor 113 also executes the cheer level detection processing and the applause level detection processing. A result of the cheer level detection processing and a result of the applause level detection processing are also stored in the database 111A as a part of the attribute detection result information.

As shown in FIG. 4, the attribute detection result information (section attribute information) is constituted of, e.g., a commercial section table, a music section table, a talk section table, and a cheer/applause table.

The commercial section table stores commercial section attribute information indicative of a star time point and an end time point of a detected commercial section. When a plurality of commercial sections are present in a sequence from a start position to an end position of the video content data, respective pieces of commercial section attribute information corresponding to the plurality of commercial sections are stored in the commercial section table. The commercial section table stores start time information and end time information indicative of a start time point and an end time point of each commercial section in accordance with each detected commercial section, respectively.

The music section table stores music section attribute information indicative of a start time point and an end time point of a detected music section. When a plurality of music sections are present in a sequence from a start position to an end position of the video content data, respective pieces of music section attribute information corresponding to the plurality of music sections are stored in the music section table. The music section tables stores start time information and end time information indicative of a start time point and an end time point of each music section in accordance with each detected music section, respectively.

The talk section table stores talk section attribute information indicative of a start time point and an end time point of a detected talk section. When a plurality of talk sections are present in a sequence from a start position to an end position of the video content data, respective pieces of talk section attribute information corresponding to the plurality of talk sections are stored in the talk section table. The talk section table stores start time information and end time information indicative of a start time point and an end time point of each talk section in accordance with each detected talk section.

The cheer/applause table stores a cheer level and an applause level in each partial data (each of time segments T1, T2, T3,) having a fixed time length in the video content data.

As shown in FIG. 3, the TV application program 202 includes a face thumbnail indication processing module 301 that executes a face navigation function. This face thumbnail indication processing module 301 is realized as, e.g., an indexing viewer program, and displays an indexing view screen for looking down at an outline of the video content data by using the indexing information (face thumbnail indexing information, scene thumbnail indexing information, section attribute information, and others) stored in the database 111A.

Specifically, the face thumbnail indication processing module 301 reads the face thumbnail indexing information (face thumbnail snapshots, time stamp information TS, and sizes) from the database 111A and uses this face thumbnail indexing information to display a list of face thumbnail snapshots of persons who appear in the video content data in a two-dimensional display area (which will be referred to as a face thumbnail indication area hereinafter) in the indexing view screen. In this case, the face thumbnail indication processing module 301 divides a total time length of the video content data into a plurality of time zones at, e.g., equal intervals and selects a predetermined number of face thumbnail snapshots that appear in each time zone from the extracted face thumbnail snapshots in accordance with each time zone. Moreover, the face thumbnail indication processing module 301 aligns and displays the predetermined number of selected face thumbnail snapshots in accordance with each time zone.

That is, the two-dimensional face thumbnail indication area includes a plurality of face snapshot display areas arranged in a matrix shape including a plurality of rows and a plurality of columns. The plurality of time zones constituting the total time length of the video content data is assigned to the plurality of columns, respectively. Specifically, for example, a plurality of time zones having the same time length which are obtained by dividing the total time length of the video content data by the number of the columns at equal intervals are assigned to the plurality of columns, respectively. Of course, the time zones assigned to the respective columns do not have to necessarily have the same time length.

The face thumbnail indication processing module 301 aligns and displays respective face thumbnail snapshots belonging to the time zone assigned to each column in the face video indication areas corresponding to the number of rows belonging to the each column in order of, e.g., appearance frequency (order of detection time length of the face thumbnail snapshots) based on the respective pieces of time stamp information TS associated with the face thumbnail snapshots. In this case, for example, face thumbnail snapshots having higher appearance frequencies (emergence frequencies) are selected for the number of rows from the facial thumbnail snapshots belonging to the time zone assigned to each column, and the selected face thumbnail snapshots are aligned and arranged from an upper side toward a lower side in order of emergence frequency. Of course, the face thumbnail snapshots which appear in the time zone assigned to each column may be aligned and displayed in order of appearance in place of order of appearance frequency.

This face navigation function enables presenting a user which person appears in which time zone in the entire video content data. A specific structural example of the face thumbnail indication area will be explained later with reference to FIG. 6 and subsequent drawings.

Further, the face thumbnail indication processing module 301 reads the scene thumbnail indexing information (scene thumbnail snapshots, time stamp information TS) from the database 111A, and aligns and displays the respective scene thumbnail snapshots in a scene thumbnail indication area (which will be referred to as a scene thumbnail indication area hereinafter) arranged on one of or both a lower side and an upper side of the face thumbnail indication area in order of appearance time of the scene thumbnail snapshots.

A time zone where no facial image appears may be present depending on video content data. Therefore, displaying both the face thumbnail indication area and the scene thumbnail indication area in the indexing view screen enables presenting user content of video content data in a time zone where no facial image appears even in this time zone.

Moreover, the face thumbnail indication processing module 301 reads the cheer level information and the applause level information from the database 111A, and displays a graph showing a change in cheer level and a change in applause level in a sequence from a start position to an end position of the video content data in a volume level indication area arranged on one of the lower side and the upper side of the face thumbnail indication area in accordance with the cheer level information and the applause level information. It is to be noted that the scene thumbnail indication area is arranged on one of or both the lower side and the upper side of the face thumbnail indication area. Therefore, the scene thumbnail indication area is arranged on one of or both the lower side and the upper side of the volume level indication area.

When a user sees this volume level indication area, he/she can be aware of where in the video content data a section with a large cheer is present and where in the video content data a section with large applause is present. The user can find a data position at which playback should be started from the entire video content while considering characters, the section attributes, the cheer level, and the applause level.

Additionally, the face thumbnail indication processing module 301 reads the section attribute information (the commercial section attribute information, the music section attribute information, and the talk section attribute information) from the database 111A, and displays a section bar including bar regions each indicative of a position (section from a start time point and an end point) of each attribute section (the commercial section, the music section, or the talk section) in a sequence from the start position to the end position of the video content data on one of the lower side and the upper side of the face thumbnail indication area in the indexing view screen in accordance with the section attribute information. This section bar includes, e.g., three sub-section bars, i.e., a commercial section bar indicative of a position of the commercial section, a music section bar indicative of a position of the music section, and a talk section bar indicative of a position of the talk section.

When a plurality of commercial sections is present in the sequence, a plurality of bar regions indicative of positions of the plurality of commercial sections are displayed in the commercial section bar. Likewise, when a plurality of music sections are present in the sequence, a plurality of bar regions indicative of positions of the plurality of music sections are displayed in the music section bar. When a plurality of talk sections are present in the sequence, a plurality of bar regions indicative of positions of the plurality of talk sections are displayed in the talk section bar. Each of the plurality of commercial sections dispersedly present in the sequence will be referred to as a partial commercial section, each of the plurality of music sections dispersedly present in the sequence will be referred to as a partial music section, and each of the plurality of talk sections dispersedly present in the sequence will be referred to as a partial talk section hereinafter.

When the section bar is displayed in the indexing view screen, it is possible to present a user which attribute section (the commercial section, the music section, or the talk section) each face thumbnail snapshot of each character in the face thumb indication area appears. Therefore, the user can find a data position where playback should be started from the entire video content data while considering each character and a section attribute.

The face thumbnail indication processing module 301 can detect face thumbnail snapshots belonging to a specific attribute section (the commercial section, the music section, or the talk section) from a plurality of face thumbnail snapshots included in face indexing information by using the section attribute information (the commercial section attribute information, the music section attribute information, and the talk section attribute information) and the time stamp information for each of the plurality of facial images.

Further, not only the commercial section, the music section, and the talk section but also, e.g., a section having a cheer level equal to or above a given fixed value (cheer section) and a section having an applause level equal to or above a given fixed value (applause section) can be used as the attribute sections. In this case, the user can selectively specify an attribute corresponding to each of the commercial section, the music section, the talk section, the cheer section, and the applause section as an attribute which should be noted.

A functional structure of the TV application program 202 will now be explained with reference to FIG. 5.

The TV application program 202 includes a recording processing module 401, an indexing control module 402, a playback reproducing module 403, and others in addition to the face thumbnail indication processing module 301.

The recording processing module 401 executes recording processing of recording broadcast program data received by the TV tuner 117 or video data input from an external device in the HDD 111. Furthermore, the recording processing module 401 also executes reserved recording processing of using the TV tuner 117 to receive broadcast program data specified by recording reservation information (channel number, a date and an hour) preset by the user and recording the broadcast program data in the HDD 111.

The indexing control module 402 controls the video processor (indexing processing module) 113 and thereby allows the video processor 113 to execute the indexing processing (image indexing processing or sound indexing processing). The user can specify whether the indexing processing is to be executed in accordance with each broadcast program data as a recording target. For example, the indexing processing of broadcast program data as a recording target which is specified to be subjected to the indexing processing is automatically started after the broadcast program data is recorded in the HDD 111. Moreover, the user can also specify video content data which should be subjected to the indexing processing from video content data already stored in the HDD 111.

The playback processing module 403 executes processing of playing back each video content data stored in the HDD 111. Additionally, the playback processing module 403 displays a present position bar in the volume level indication area. The present position bar is a bar indicating where in the entire content a scene thumbnail snapshot which is currently displayed in the scene thumbnail indication area is placed. When the user clicks a left button in a state where a pointer is placed in the volume level indication area, the current position bar moves to a position of the pointer. Further, the scene thumbnail snapshot displayed in the scene thumbnail indication area is changed to a scene snapshot corresponding to a position of the current position bar.

Furthermore, the playback processing module 403 has a function of starting playback of video content data from a time point where the scene thumbnail snapshot is displayed or a time point which is a predetermined time before this time point when the user moves the pointer onto the displayed scene thumbnail snapshot and operates a left button so that a playback instruction event is input.

When the user selectively specifies a plurality of attribute sections, he/she can determine a playback position of the video content data while watching a face thumbnail list paying attention to various attributes.

It is to be noted that the indexing processing does not have to be necessarily executed by the video processor 113, and the TV application program 202 may have a function of executing the indexing processing, for example. In this case, the indexing processing is executed by the CPU 101 under control of the TV application program 202.

A specific structure of the indexing view screen will now be explained with reference to FIGS. 6 to 11.

FIG. 6 shows an example of the indexing view screen displayed in the LCD 17 by the face thumbnail indication processing module 301. This indexing view screen is a screen obtained by performing the indexing processing with respect to given video content data (e.g., broadcast program data). This indexing view screen includes the face thumbnail indication area which displays a list of face thumbnail snapshots, the volume level indication area, the section bar, and the scene thumbnail indication area which displays a list of scene thumbnail snapshot in an accordion format.

Here, the accordion format means a display format in which a selected scene thumbnail snapshot is displayed in a regular size (full size) having an original aspect ratio and any other scene thumbnail snapshot is displayed while reducing its size in a lateral direction. In FIG. 6, each scene thumbnail snapshot having a larger distance from the selected scene thumbnail snapshot is reduced in the lateral size.

In the volume level indication area, a graph representing a time change of cheer level (graph shown in a thick color in FIG. 6) and a graph showing a time change of applause level (graph shown in a faint color in FIG. 6) are displayed.

An abscissa in the two graphs is a time axis representing a start position to an end position of video content. Furthermore, an ordinate in the two graphs represents a level (magnitude). Moreover, the graph of the applause level is superimposed on the graph of the cheer level in such a manner that zero levels of the ordinates in the two graphs become each to each other. A time from the start position to the end position of the video content is assigned to the time axis of the abscissa at equal intervals.

It is generally considered that the applause level is higher than the cheer level. Therefore, when the applause level is superimposed on the cheer level, the graph of the cheer level is hidden behind the graph of the applause level and thereby cannot be seen in some cases. In this embodiment, the graph of the cheer level is superimposed on the graph of the applause level so that the graph of the cheer level can be seen as much as possible.

It is to be noted that, if the cheer level is considered to be higher than the applause level, the graph of the applause level may be superimposed on the graph of the cheer level. Moreover, the order of superimposing the graphs may be changed depending on settings.

Figure 7:
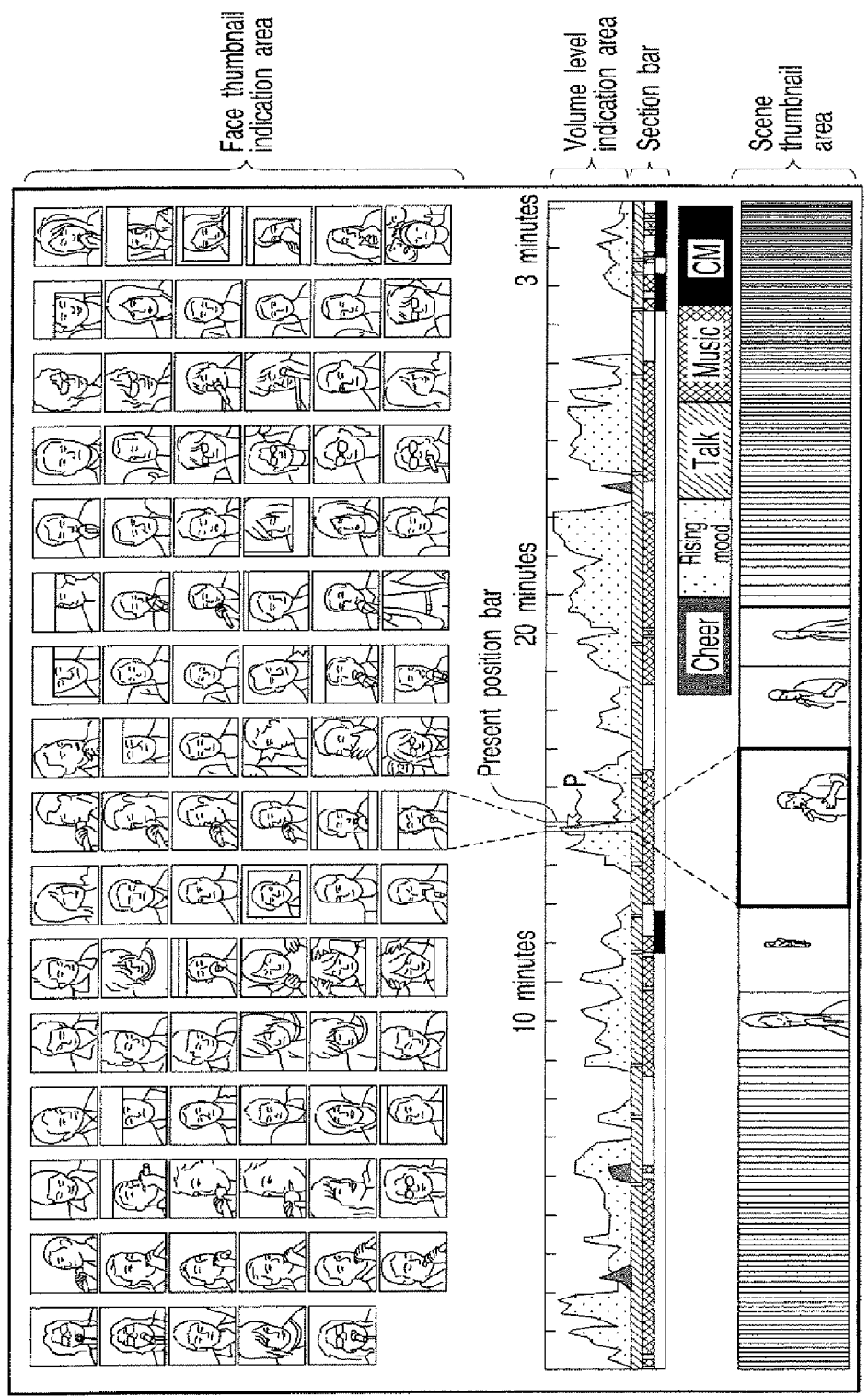
FIG. 7 is a view showing an example of the indexing view screen displayed in the display apparatus by the electronic apparatus according to the embodiment.

The current position bar is displayed in the volume level indication area. The current position bar is a bar showing where in the entire content an scene thumbnail snapshot which is currently displayed in the scene thumbnail indication area is placed. When the user operates the touch pad 16 to manipulate the left button in a state where a pointer P is displayed in the volume level indication area, a selected scene snapshot displayed in the scene thumbnail indication area is changed in accordance with a position of the pointer P as shown in FIG. 7.

Additionally, when an enter key in the keyboard is pressed in a state where a scene snapshot is selected in the scene thumbnail indication area or the left button is pressed in a state where the pointer is superimposed to input an event instructing playback, playback of the video content is performed from the selected scene snapshot. Playback of the video content is carried out at, e.g., a time point a predetermined time before, e.g., a time point two seconds before.

The section bar includes the talk section bar, the music section bar, and the commercial section bar. In the commercial section bar, a bar region (black strip-like region in FIG. 6) is displayed at a position of each commercial section (each partial commercial section). In the music section bar, a bar region (cross-hatched strip-like region in FIG. 6) is displayed at a position of each music section (each partial music section). In the talk section bar, a bar region (hatched strip-like region in FIG. 6) is displayed at a position of each talk section (each partial talk section).

Figure 8:
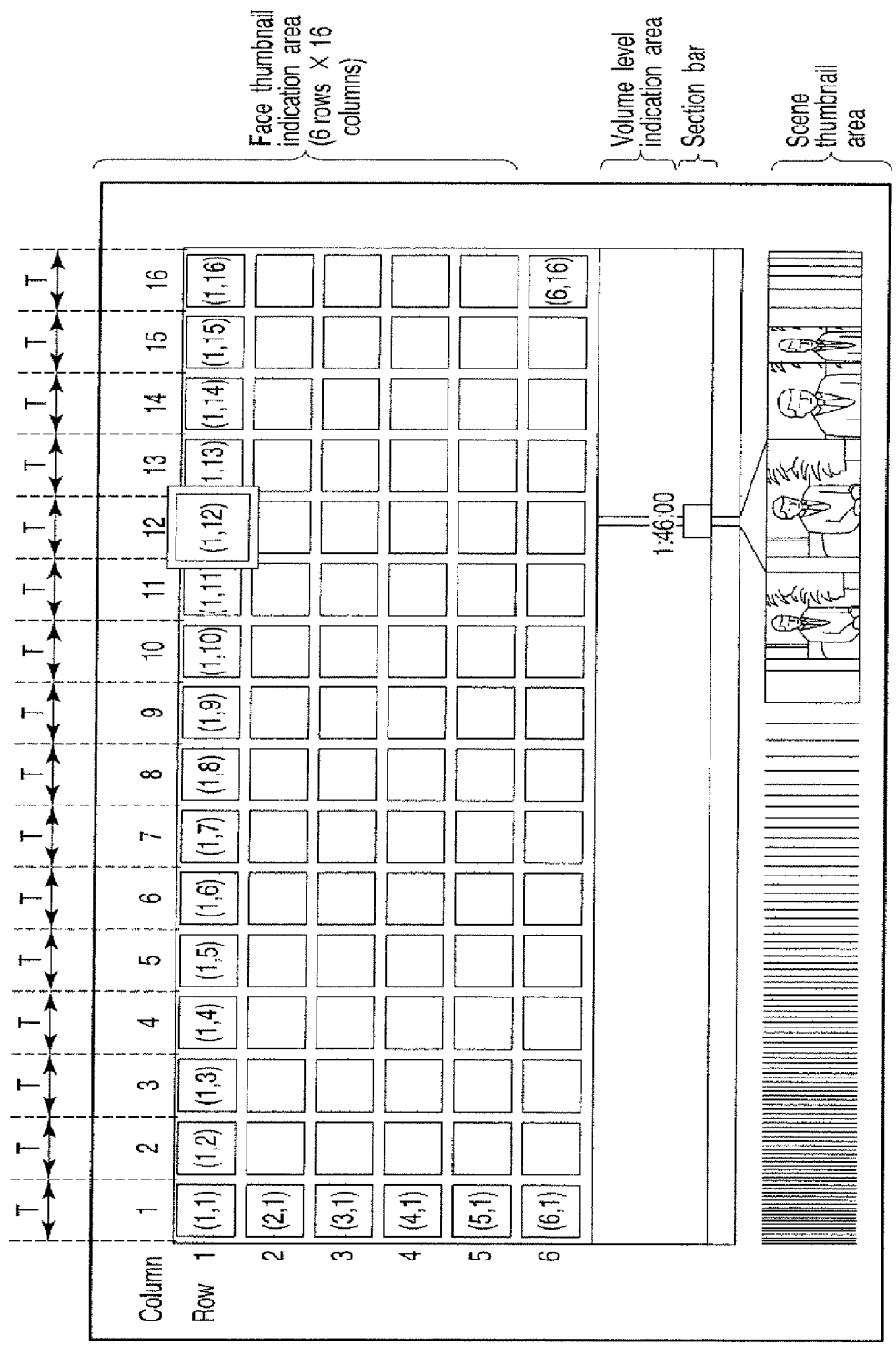
FIG. 8 is a view showing a structural example of a face thumbnail indication area included in the indexing view screen depicted in FIG. 6.

FIG. 8 shows a structural example of the face thumbnail indication area.

The face thumbnail indication area includes a plurality of face snapshot indication areas arranged in a matrix shape including a plurality of rows and a plurality of columns. In FIG. 7, the face thumbnail indication area consists of six rows×16 columns. The number of the facial snapshot indication areas included in the face thumbnail indication area is 96.

Each of a plurality of time zones having the same time length T obtained by, e.g., dividing a total time length of video content data by the number of the columns (=16) at equal intervals is assigned to each of the columns 1 to 16.

For example, if a total time length of video content data is two hours, the period of two hours is divided into the 16 time zones at equal intervals. In this case, the time length T of each time zone is 7.5 minutes. For example, a time zone starting from 0:00:00 to 0:07:30 is assigned to the column 1, a time zone from 0:07:30 to 0:15:00 is assigned to the column 2, and a time zone from 0:15:00 to 0:22:30 is assigned to the column 3. The time length T of each time zone varies in accordance with a total time length of video content data.

Of course, the lengths of the time zones assigned to the plurality of columns do not have to be necessarily equal to each other.

The face thumbnail indication processing module 301 aligns and displays respective face thumbnail snapshots belonging to the time zones assigned to the respective columns in the six face snapshot indication areas in the respective columns in the order of frequency based on the pieces of time stamp information corresponding to the face snapshots extracted by the video processor 113. In this case, the face thumbnail indication module 301 selects face thumbnail snapshots corresponding to the number of the rows (six) from the face thumbnail snapshots belonging to a time zone assigned to a display processing target column, and aligns and displays the selected face thumbnail snapshots corresponding to the number of the rows.

In this manner, the face thumbnail indication area uses a time axis in which a left end position (1, 1) is determined as a base point and a right end position (6, 16) is determined as a trailing end of video content data.

Each face thumbnail snapshot in the face thumbnail indication area is set to either a non-selected "standard" state or a selected "focus" state. A size of a face thumbnail snapshot in the "focus" state is set to be larger than a size in the "standard" state. FIG. 7 shows an example where a face thumbnail snapshot at a coordinate (1, 12) is in the "focus" state.

The number of the scene thumbnail snapshot displayed in the scene thumbnail indication area is set to, e.g., one of 240, 144, 96, and 48 in accordance with the user's setting. A default value is, e.g., 240.

A relationship between the face thumbnail indication area and the scene thumbnail indication area will now be explained with reference to FIG. 9.

An aggregation of face thumbnail indication areas bellowing to the same column, i.e., each column in the face thumbnail indication area is called a "large section". Further, each piece obtained by dividing the "large section" is called a "small section". The number of the small sections included in one large section is given as a quotient obtained by dividing the number of the scene thumbnail snapshots displayed in the scene thumbnail indication area by the number of the columns in the face thumbnail indication area.

When a given scene thumbnail snapshot in the scene thumbnail indication area is selected, the face thumbnail indication processing module 301 selects a column (large section) to which a time zone of the selected scene thumbnail snapshot is assigned from the plurality of columns (plurality of large sections) in the face thumbnail indication area based on the time stamp information of the selected scene thumbnail snapshot. The selected large section is a large section including the selected scene thumbnail snapshot as the small section. Furthermore, the face thumbnail indication processing module 301 highlights the selected large section.

Figure 10:
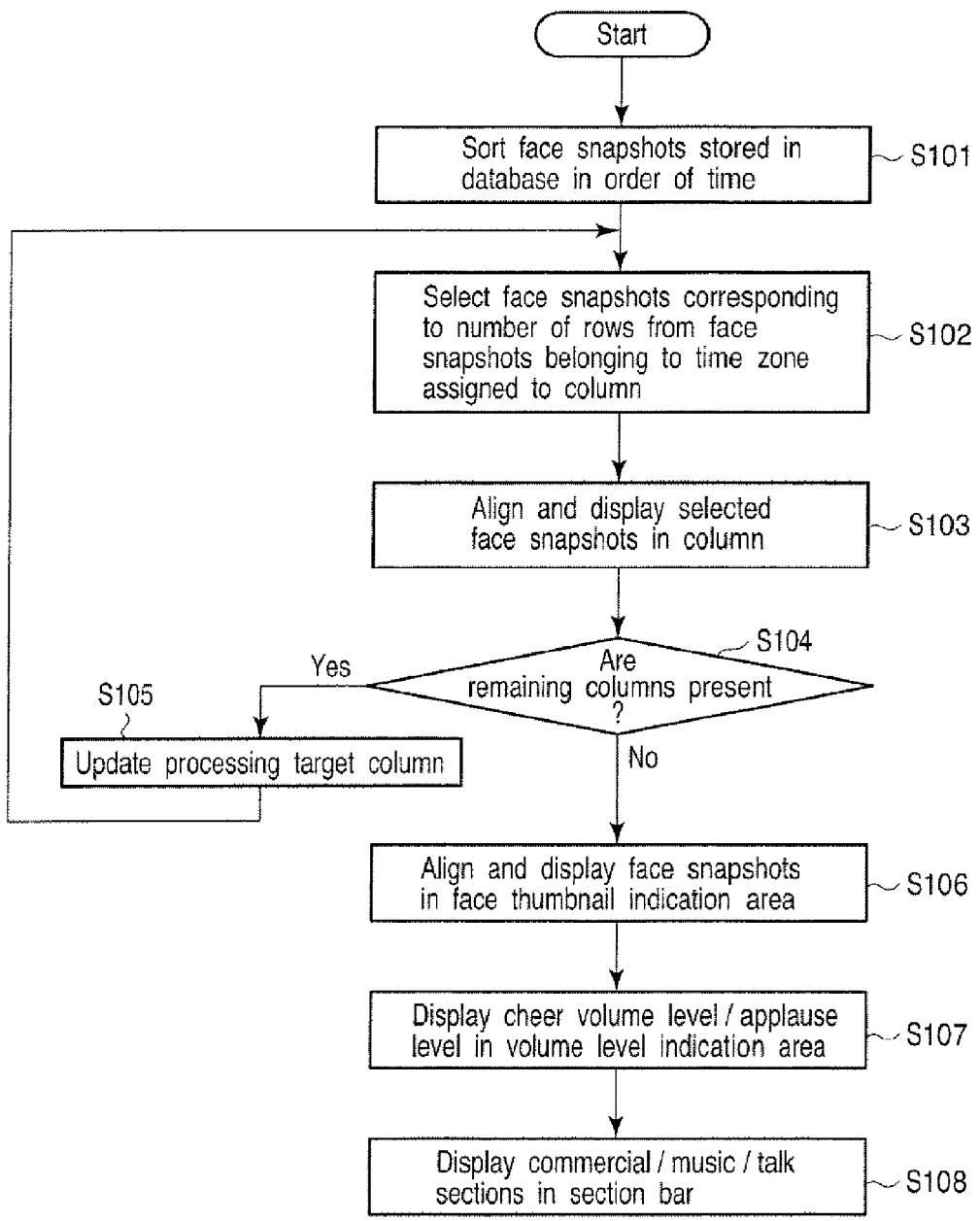
FIG. 10 is a flowchart showing an example of a procedure of face thumbnail indication processing executed by the electronic apparatus according to the embodiment.

A procedure of display processing executed by the face thumbnail indication processing module 301 will now be explained with reference to a flowchart of FIG. 10.

First, the face thumbnail indication processing module 301 sorts face thumbnail snapshots stored in the database 111A in order of appearance time of these face thumbnail snapshots based on the pieces of time stamp information associated with these face snapshots (step S101). Then, the face thumbnail indication processing module 301 determines the number of rows and the number of columns in accordance with a face thumbnail snapshot size to be displayed which is specified by a user, and evenly divides, e.g., a total time length of video content data as an indexing target by the number of the columns to calculate a time zone which is assigned to each column (large section). Furthermore, the face thumbnail indication processing module 301 selects face thumbnail snapshots corresponding to the number of the rows from face snapshots belonging to a time zone assigned to a display processing target column (step S102). When the number of the face thumbnail snapshots belonging to the time zone assigned to the display processing target column is larger than the number of the rows, the face thumbnail indication processing module 301 can execute processing of preferentially selecting face thumbnail snapshots having higher appearance frequencies, for example.

In this case, the face thumbnail indication processing module 301 preferentially selects face thumbnail snapshots having higher appearance frequencies in the time zone assigned to the display processing target column from the face snapshots belonging to this time zone. For example, the video processor 113 can execute clustering processing of classifying respective face snapshots of the same person to the same category based on a correlation of characteristic data of each extracted face thumbnail snapshot. In this case, as shown in FIG. 11, the respective face thumbnail snapshots are classified in accordance with each person (i.e., in accordance with each category) and stored in the database 111A. In FIG. 11, a category 1 represents an aggregation of face thumbnail snapshots of a given person A, a category 2 represents an aggregation of face thumbnail snapshots of a given person B, and a category 3 represents an aggregation of face thumbnail snapshots of a given person C. The face thumbnail indication processing module 301 selects face thumbnail snapshots of a person having a high appearance frequency by priority. It is to be noted that, in a time zone where face thumbnail snapshots alone of the same person keep appearing for a relatively long time, a plurality of different face thumbnail snapshots of the same person may be displayed in a column corresponding to this time zone.

Moreover, when the number of face thumbnail snapshots belonging to the time zone assigned to the display processing target column is higher than the number of the rows, the face thumb nail indication processing module 301 can execute processing of preferentially selecting face thumb nail snapshots having larger sizes from the face thumb nail snapshots belonging to the time zone assigned to the display processing target column based on the pieces of size information of respective face thumbnail snapshots stored in the data base 11A.

A size of a face thumbnail snapshot extracted from a frame showing a face in closeup is relatively large. Therefore, the importance of a person may possibly rise as a size of an extracted face thumbnail snapshot is increased. Therefore, selecting face thumbnail snapshots having larger sizes by priority enables preferentially displaying face thumbnail snapshots of a person with the high importance.

Subsequently, the face thumbnail indication processing module 301 aligns and displays the respective selected face thumbnail snapshots in the plurality of face snapshot indication areas in the display processing target column (step S103) in order of, e.g., appearance frequency. A face thumbnail snapshot with a higher appearance frequency is displayed in a face thumbnail indication area at a higher position.

The processing in steps S102 and S103 is repeatedly executed while updating the number of the display processing target column until processing for all the columns is completed (steps S104 and S105). As a result, a plurality of face thumbnail snapshots are displayed in the face snapshot indication areas.

It is to be noted that, when the number of face thumbnail snapshots belonging to the time zone assigned to the display processing target column is smaller than the number of the rows, scene thumbnail snapshots belonging to the corresponding time zone can be displayed in the display processing target column.

When the processing for all the columns is completed (NO in step S104), the face thumbnail indication processing module 301 aligns and displays respective scene thumbnail snapshots stored in the database 11A in the scene thumbnail indication area in order of appearance time of the scene thumbnail snapshots based on respective pieces of time stamp information of these scene thumbnail snapshots (step S106).

Then, the face thumbnail indication processing module 301 reads cheer level information and highlight information from the database 111A, and displays a graph showing a change in cheer level in a sequence from a start position to an end position of the video content data and a graph showing a change in highlight level in the sequence in the volume level indication area in accordance with the cheer level information and the highlight information (step S107).

Subsequently, the face thumbnail indication processing module 301 reads commercial section attribute information, music section attribute information, and talk section attribute information from the database 111A, and displays a commercial section bar, a music section bar, and a talk section bar based on the commercial section attribute information, the music section attribute information, and the talk section attribute information (step S108). A bar region indicative of a position of the commercial section is displayed in the commercial section bar. Likewise, a bar region indicative of a position of the music section is displayed in the music section bar, and a talk bar region indicative of a position of the talk section is displayed in the talk section bar.

Figure 12:
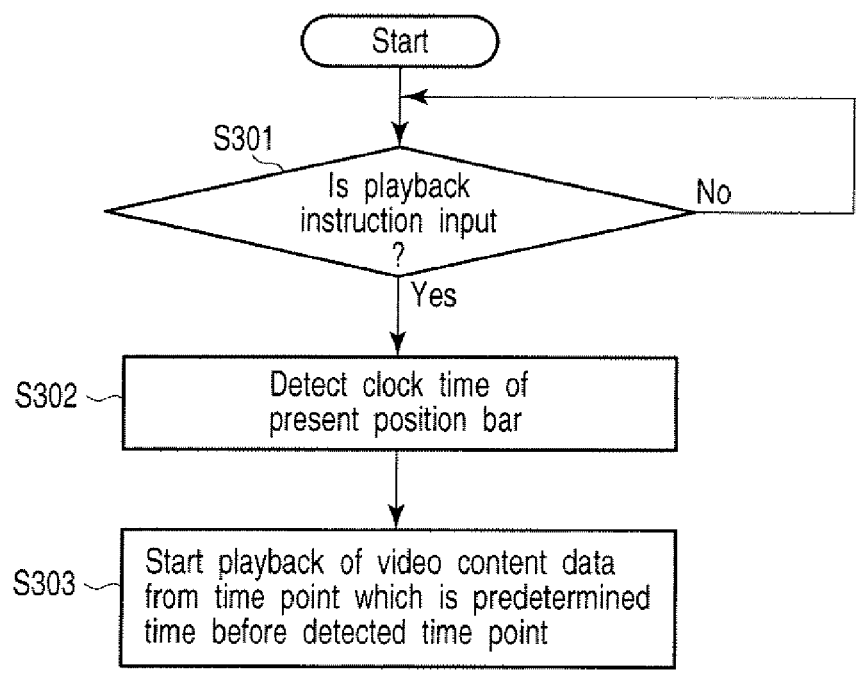
FIG. 12 is a flowchart showing an example of a procedure of playback processing executed by the electronic apparatus according to the embodiment.
Figure 14:
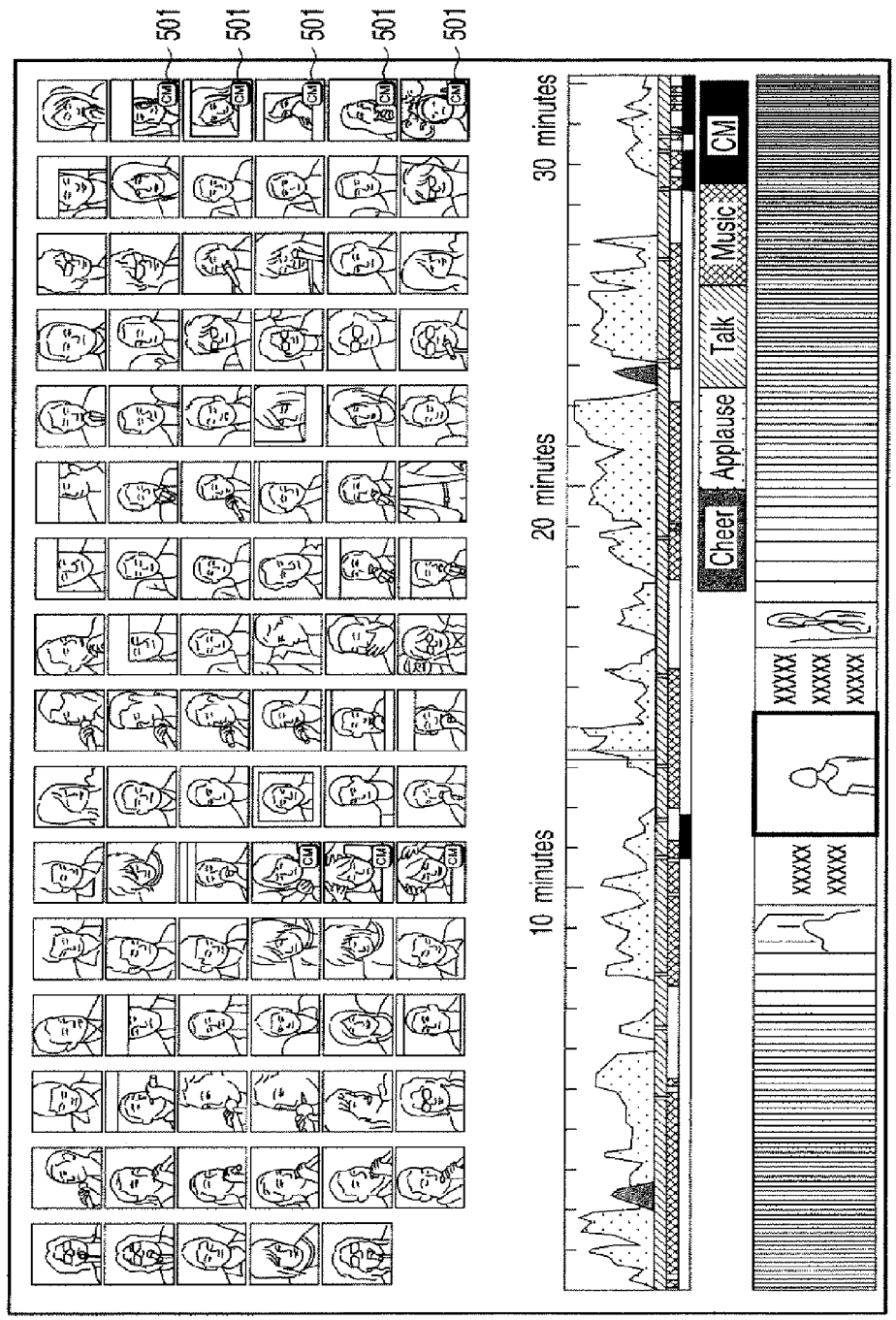
FIG. 14 is a view showing a modification of the indexing view screen displayed in the display apparatus by the electronic apparatus according to the embodiment.

A procedure of playback processing executed by the playback processing module 403 will now be explained with reference to a flowchart of FIG. 12.

When an event instructing playback of video content data is input in accordance with a user's operation (YES at step S301), the playback processing module 403 detects a clock time where the position bar is placed (step S302). Additionally, the playback processing module 403 starts playback of the video content data from a time point which is a predetermined time before the detected time point, e.g., a time point two seconds before (step S303).

As explained above, in this embodiment, it is possible to selectively use a first display mode in which a list of face thumbnail snapshots is displayed with the entire video content data being determined as a target and a second display mode in which a list of face thumbnail snapshots is displayed while paying attention to a specific attribute section in the entire video content data. Therefore, it is possible to present a user which person appears in which time zone in the entire video content data without playing back the video content data. Further, it is also possible to pay attention to a specific attribute section in the video content data rather than the entire video content data to present the user a list of characters.

Therefore, the user can look down at the video content data while paying attention to, e.g., a commercial section in the video content data or look down at the video content data while playing attention to any other attribute section (e.g., music, a talk, a cheer, a highlight, or a main part) in the video content data.

It is to be noted that the video processor 113 that functions as the indexing processing module generates the indexing information (facial image indexing information, section attribute information, and others) in this embodiment, but the indexing processing does not have to be executed when, e.g., the indexing information associated with broadcast program data is previously included in the broadcast program data. Therefore, the face navigation function according to this embodiment can be also realized by using the data base 111A and the face thumbnail indication processing module 301 alone.

It is to be noted that the graph displayed in the volume level indication area may be a bar graph as shown in FIG. 13. In case of the bar graph, a volume level in a predetermined period from a given time is representatively displayed. In this case, a maximum value in the predetermined period may be displayed or an average value in the same may be displayed. Showing the maximum value is preferable to distinguish a scene with a cheer and a scene with applause.

Furthermore, although graduations on the time axis of the abscissa are provided at equal intervals and widths of bars shown in the bar graph are fixed in FIG. 13, the graduations and the widths may be equal to time intervals in accordance with widths of scene thumbnail snapshots displayed in the scene thumbnail indication area. It is to be noted that setting widths of the bars to be equal to widths of the small sections is preferable.

It is to be noted that a mark indicative of extraction from commercial may be displayed at a corner of a face thumbnail snapshot extracted from snapshots displayed in the commercial section by making reference to the commercial section attribute information. When the mark is added, it is possible to immediately know that an image with this mark is a face thumbnail snapshot extracted from screen images displayed in the commercial section.

Moreover, since the procedure of the face thumbnail indication processing can be all realized by using software in this embodiment, introducing this software into a regular computer through a computer readable storage medium enables readily realizing the same effect as that of this embodiment.

Additionally, the electronic apparatus according to this embodiment can be realized by not only the computer 10 but also various kinds of consumer electronic apparatuses such as an HDD recorder, a DVD recorder, or a television set. In this case, the function of the TV application program 202 can be realized by hardware such as a DSP or a microcomputer.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic apparatus comprising:
an extracting module configured to extract first sound level information which indicates a time change of a first sound level which is detected from video content data by a first detecting method and second sound level information which indicates a time change of second sound level which is detected from the video content data by a second detecting method; and
a video content information displaying module configured to display two types of graphs of a first sound graph showing a time change of the first sound level in accordance with the first sound level information and a second sound graph showing a time change of the second sound level in accordance with the second sound level information in a volume level indication area in a two-dimensional display area, an abscissa of the first sound graph and the second sound graph indicating a time axis, an ordinate of the first sound graph and the second sound graph indicating the first sound level or the second sound level, the time axis of the two types of graphs indicating a start position to an end position of the video content data.

2. The apparatus according to claim 1, wherein the video content information displaying module superimposes one of the first sound graph and the second sound graph on the other of the first sound graph and the second sound graph to be displayed in such a manner that a zero level of the first sound level becomes equal to a zero level of the second sound level.

3. The apparatus according to claim 1, further comprising an inputting module configured to move a bar on the time axis in the volume level indication area in accordance with an input operation by a user,
wherein the two-dimensional display area comprises a scene thumbnail image display area which is displayed on one or both of a lower side and an upper side of the volume level indication area, and
the video content information displaying module displays in the scene thumbnail image display area a representative image in the video content data associated with a position on the time axis at which the bar is placed.

4. The apparatus according to claim 3, wherein the scene thumbnail image display area is an area which displays a plurality of images along the time axis direction, and it displays the representative image with an original aspect ratio and displays any other image while reducing its size in a lateral direction.

5. The apparatus according to claim 3, further comprising playback processing module configured to start playback of the video content data at a time point corresponding to a time position at which the bar is placed or a time point which is a predetermined time before the time point when an event instructing playback of the video content data is input.

6. The apparatus according to claim 5, further comprising a section attribute information outputting module configured to analyze the audio data included in the video content data and generate section attribute information indicating a start time point and an end time point of at least one predetermined attribute section in a plurality of attribute sections including a commercial section, a music section where music is put on, and a talk section where a person is having a talk included in the video content data,
wherein the video content information displaying module displays in the two-dimensional display area a section bar including a bar region indicating a position of the predetermined attribute section in a sequence from a start position to an end position of the video content data based on the section attribute information.

7. The apparatus according to claim 1, wherein the first sound level comprises a cheers level, and the second sound level comprises an applause level.

8. A scene-type display method comprising:
extracting first sound level information indicating a time change of first sound level which is detected from the video content data by a first detecting method and second sound level information indicating a change in second sound level which is detected from the video content data by a second detecting method; and
displaying two types of graphs of a first sound graph showing a time change of the first sound level in accordance with the first sound level information and a second sound graph showing a time change of the second sound level in accordance with the second sound level information in a volume level indication area in a two-dimensional display area,
wherein an abscissa of the first sound graph and the second sound graph indicates a time axis, an ordinate of the first sound graph and the second sound graph indicates the first sound level or the second sound level, and the time axis of the two types of graphs indicates a start position to an end position of the video content data.

9. The method according to claim 8, wherein one of the first sound graph and the second sound graph is superimposed on the other of the first sound graph and the second sound graph to be displayed in the volume level indication area in such a manner that a zero level of the first sound level becomes equal to a zero level of the second sound level.

10. The method according to claim 8, wherein a bar which moves on the time axis in accordance with an input operation by a user is displayed in the volume level indication area, and
a representative image in the video content data associated with a position on the time axis at which the bar is placed is displayed in a scene thumbnail image display area in the two-dimensional display area.

11. The method according to claim 10, wherein the scene thumbnail image display area is displayed on one or both of a lower side and an upper side of the volume level indication area, and
the scene thumbnail image display area is an area which displays a plurality of images along the time axis direction, the representative image is displayed with an original aspect ratio, and any other image is displayed while reducing its size in a lateral direction.

12. The method according to claim 10, wherein, when an event instructing playback of the video content data is input in a state where the bar is displayed, playback of the video content data is started from a time point corresponding to a time position at which the bar is placed or a time point which is a predetermined time before the time point.

13. The method according to claim 8, further comprising:
analyzing audio data included in the video content data;
generating section attribute information indicating a start time point and an end time point of at least one predetermined attribute section in a plurality of attribute sections including a commercial section, a music section where music is put on, and a talk section where a person is having a talk included in the video content data; and
displaying a section bar including a bar region indicating a position of the predetermined attribute section in a sequence from a start position to an end position of the video content data in the two-dimensional display area based on the section attribute information.

14. The method according to claim 8, wherein the first sound level comprises a cheers level, and the second sound level comprises an applause level.

* * * * *